Figure 1:
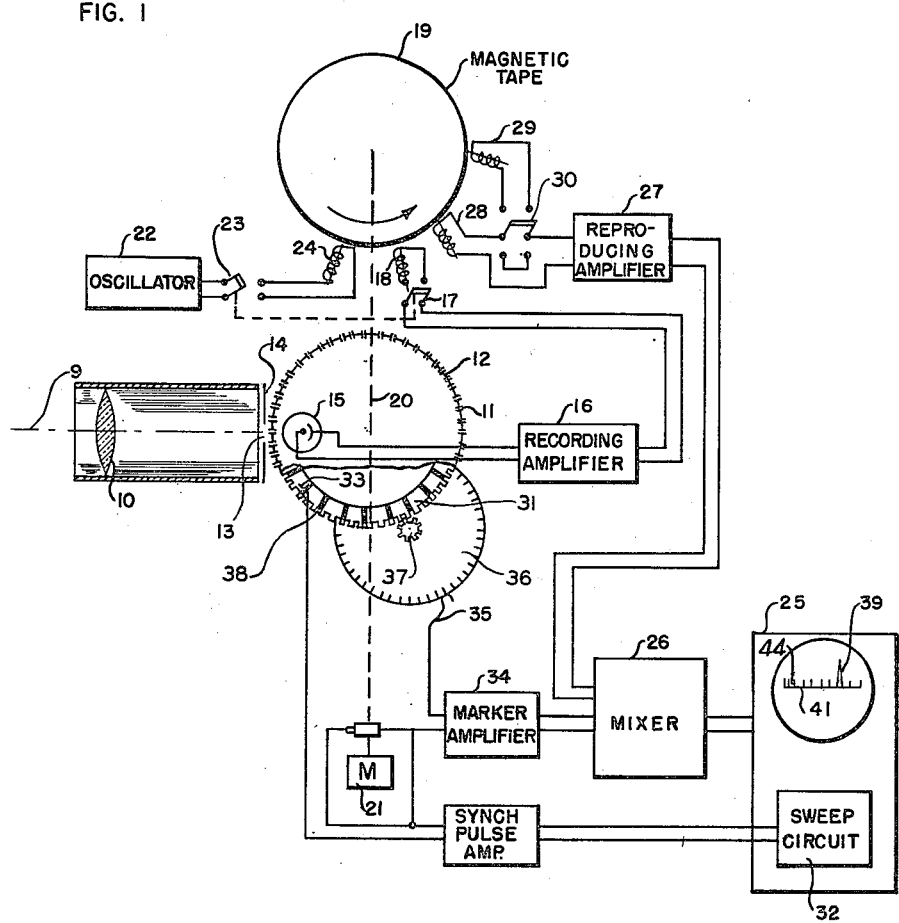

July 30, 1957  M. KEISER ET AL  2,800,831
FLASH AZIMUTH LOCATOR HAVING IMAGE SCANNING MEANS
Filed June 13, 1945  4 Sheets-Sheet 1

INVENTOR.
MORRIS KEISER
FRED B. DANIELS
BY  BERNARD M. JAFFE

William D. Hall.
ATTORNEY

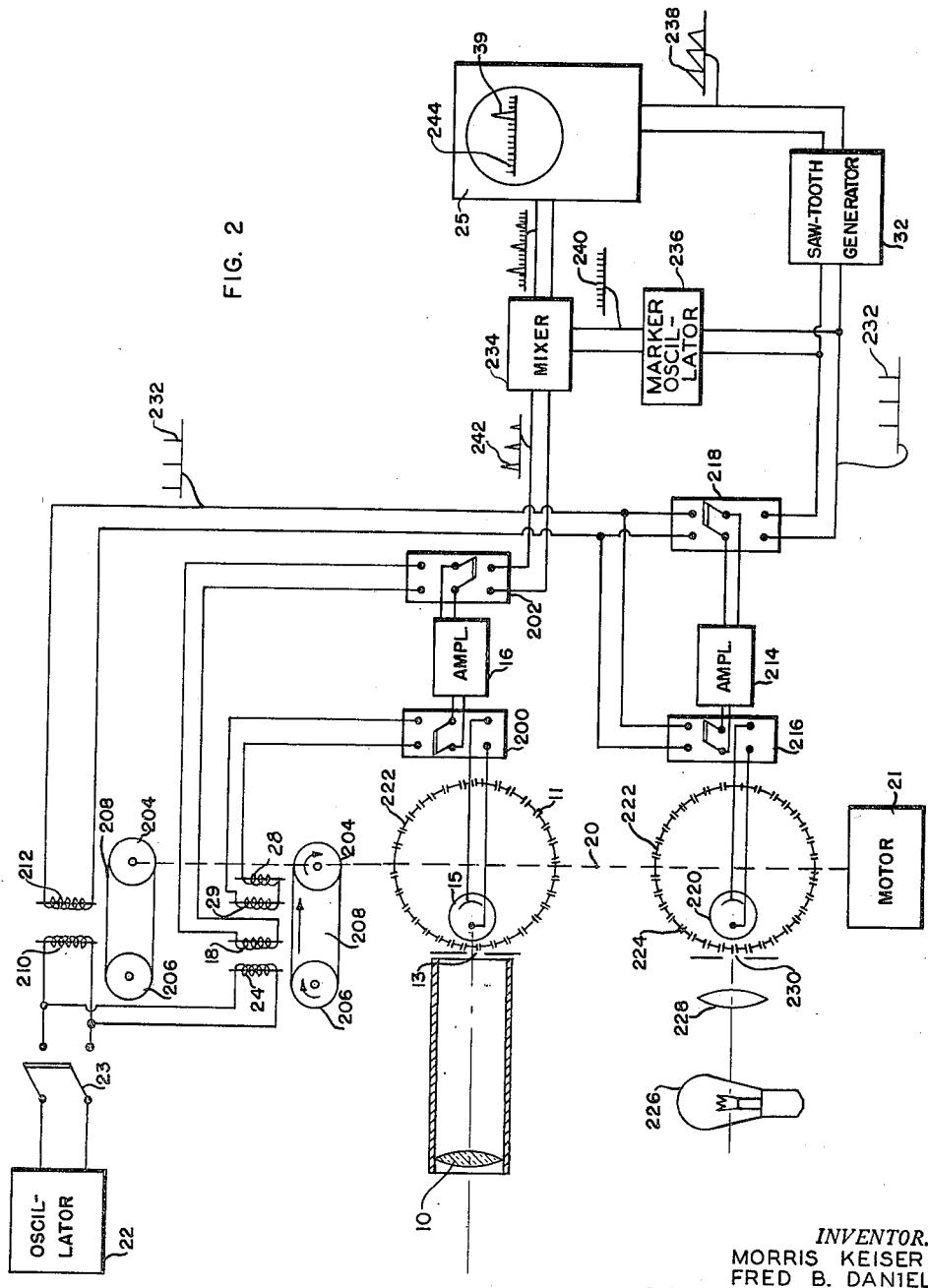

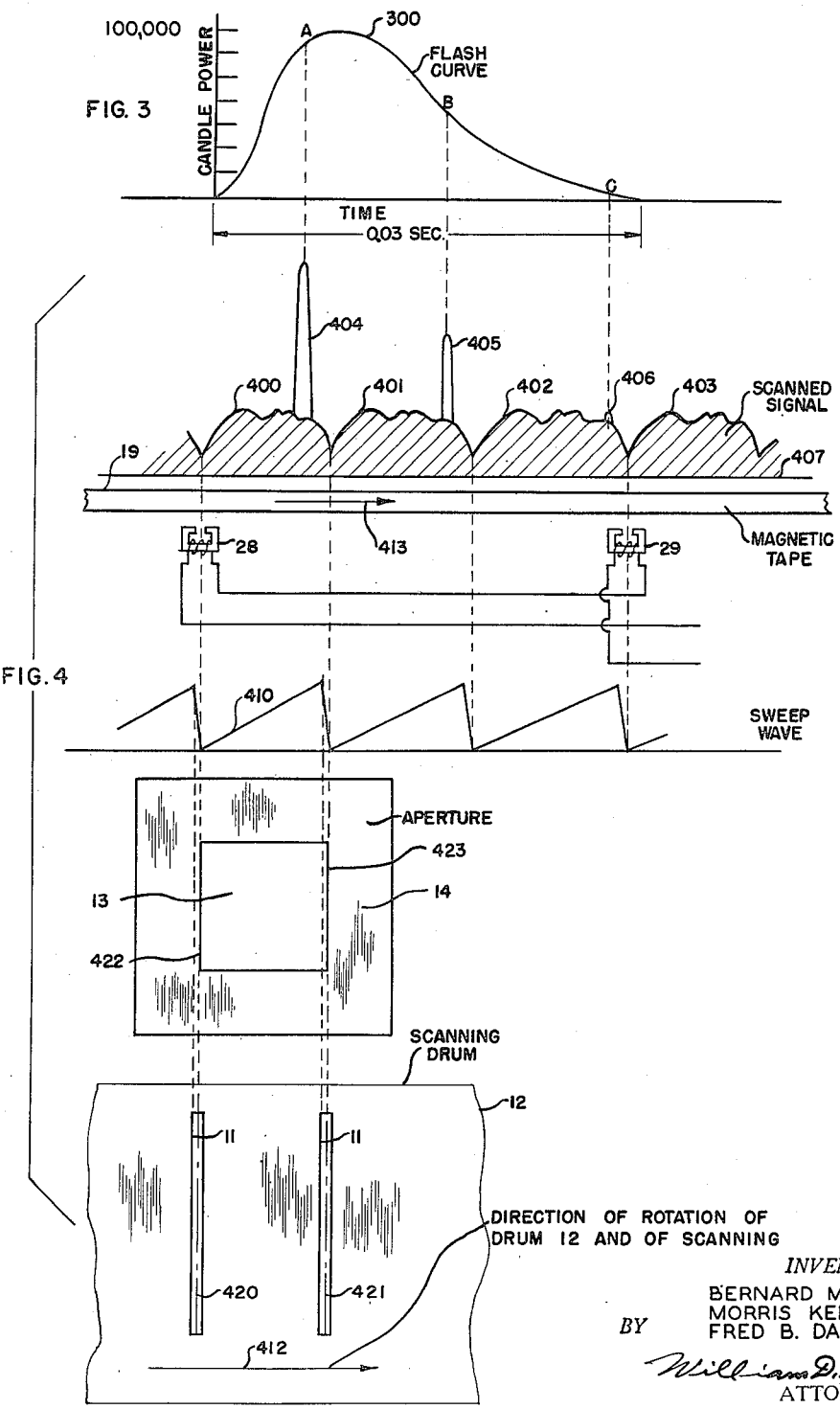

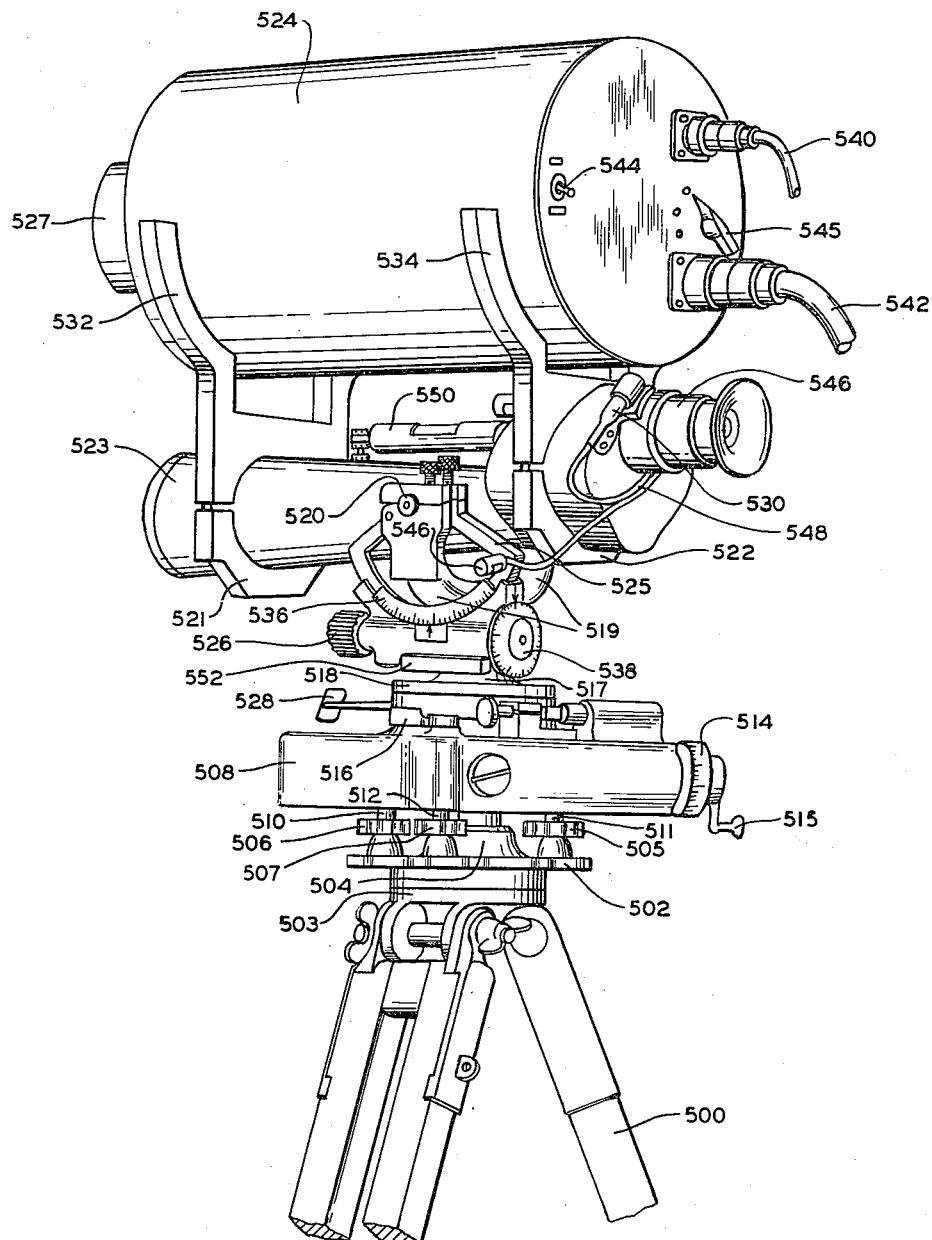

United States Patent Office 2,800,831
Patented July 30, 1957

2,800,831

FLASH AZIMUTH LOCATOR HAVING IMAGE SCANNING MEANS

Morris Keiser and Fred B. Daniels, Long Branch, N. J., and Bernard M. Jaffe, New York, N. Y., assignors to the United States of America as represented by the Secretary of War Application June 13, 1945, Serial No. 599,297

15 Claims. (Cl. 88—1)

(Granted under Title 35, U. S. Code (1952), sec. 266)

The invention described herein may be manufactured and used by or for the Government for governmental purposes, without the payment to us of any royalty thereon.

This invention relates to a flash azimuth locator, or a device capable of determining the azimuth of a distant, instantaneous flash, such as flash due to firing of an enemy gun.

It is well known in the art of interior ballistics that the desired muzzle velocities of large projectiles can not be attained without flash with the known compositions of the propellant powders and flash-reducing agents. The resulting flashes are visible with a naked eye at night, and with the flash azimuth locator in the daytime. These flashes alone, or together with some additional apparatus not disclosed in this application, may be used for determining either the azimuth alone, or the exact location, i. e., both azimuth and range, of a flash source.

In the prior art flash-ranging has been performed by pointing a telescope, provided with a reticle, in the direction of azimuth, given to an observer by the central station, and observing manually the assigned region of space until the occurrence of flash. At the time of flash the operator had to note not only the occurrence of the flash but also the location of the flash with respect to the reticle. Since the observer's attention may be focussed upon a part of the reticle different from that at which the flash occurs, the accuracy and certainty of location of flash is only approximate. This is especially the case when one takes into consideration the fact that continuous observation of the field of view imposes a continuous strain on the operator and the concomitant fatigue reduces the accuracy and efficiency of the observer to such an extent that the observations become practically worthless. The invention substitutes a recording telescope for determining the azimuth of flashes in which the angular position of the flash or its position with respect to the reticle is automatically recorded and the duties of the operator are restricted solely to the operation of a switch which stops the recording process upon the observation of the flash. The recorder is so constructed that it may be operated from a remote point so that the operator may be a safe distance away from the recorder and be under some protective structure while the automatic recorder and the telescope may be installed at a relatively exposed and elevated position so that the field of view of the telescope covers the designated region of space. The flash azimuth locator also includes a reproducing channel terminating in the cathode ray oscilloscope and the recorded flash is reproduced on the screen of the oscilloscope in proper azimuth relationship with respect to the base line also appearing on the same screen.

It is therefore an object of this invention to provide a flash azimuth locator capable of recording an intercepted flash and for reproducing the record along a timing locus in such a time relationship with respect to this locus as to indicate the azimuth of the recorded flash.

An additional object of this invention is to provide a flash azimuth locator having scanning-recording means and reproducing instrumentalities capable of producing a visual image of the recorded flash in proper azimuth relationship with respect to the reference points.

Still another object of this invention is to provide a recording flash azimuth locator including a telescope, an aperture at the image-forming plane of said telescope, the telescope forming an instantaneous real image of an intercepted flash at the aperture in the azimuth relationship with respect to the center of the aperture corresponding to the azimuth relationship of the flash with respect to the optical axis of the telescope, and instrumentalities in scanning relationship with respect to the aperture for converting the instantaneous image of the flash into a recurrent image along a timing locus, the position of the recurrent image along the timing locus corresponding to the azimuth position of the true image at said aperture.

Yet another object of this invention is to provide a recording flash azimuth locator including scanning instrumentalities, a continuously rotated magnetic tape, a recording channel between the scanning instrumentalities and the magnetic tape whereby the results of the scanning operation are recorded on the magnetic tape and the reproducing channel including a cathode ray oscilloscope for reproducing the recorded flash on the screen of the oscilloscope in the azimuth-determining relationship with respect to the sweep wave used for producing a base line on the screen of the oscilloscope.

These and other features of the invention will be more clearly understood from the following detailed description and the accompanying drawings in which:

Figure 1 is a block diagram of the flash azimuth locator,

Figure 2 is a block diagram of a modified version of the flash azimuth locator, the modification residing in making the magnetic tape free-running, Figure 3 is a typical candlepower-vs.-time curve of a gun flash, Figure 4 illustrates oscillograms of illumination scanned by a scanning drum and synchronizing relationships between the recording and reproducing channels, Figure 5 illustrates a perspective view of the flash azimuth locator, the block diagrams of which are illustrated in Figs. 1 and 2.

Referring to Fig. 1, an optical telescope system illustrated diagrammatically as a lens 10, is pointed with its optical axis in the direction of the expected flash. The telescope forms a real image of the flash, and of a region of space which it is desired to examine, in the plane of rectangular aperture 13 provided in an aperture plate 14. Plate 14 is mounted directly in front of a scanning cylinder 12 which consists of a slotted drum having equidistant slots 11. The scanning drum is mounted on a vertical shaft and scans the aperture from one side-edge of the aperture to the other with the narrow vertical slots. In one embodiment of the invention, the horizontal slot dimension, i. e., in the direction of scanning, has an angular slot width of 1 mil since this is the desired limit of angular resolution of the locator. The optical axis of the telescope is coaxial with the normal axis of the aperture and is in the radial relationship to the cylinder. The aperture is the field stop of the system, and its size, together with the constants of the optical system determine the angular field of view of the instrument, which in a typical case is 60 mils by 60 mils. It is preferable to make the diagonal line joining the corners of the square aperture equal to the diameter of the image of the field of view of the telescope produced by the latter in the plane of aperture 13; this is done in order to utilize as much of the image as possible. Thus, the dimensions of the aperture depend upon the focal length of the lens system used in the telescope and the desired angle of acceptance of this lens system. The light leaving the aperture is sufficiently divergent so that a photo-electric cell 15 placed immediately behind the drum, receives a sufficiently defocussed light to avoid complete obstruction of any image by the anode of the cell and the concomitant formation of the blind spots. The scanned gun flash is converted into electrical pulses which are impressed on a recording amplifier 16, the output of which is connected through a switch 17 to a recording magnetic head 18 which is positioned in recording relationship with respect to a magnetic tape 19. The distance between the center lines 420 and 421, Fig. 4, of the scanning slots 11 is preferably equal to the horizontal dimension of the aperture, as illustrated in Fig. 4, where two scanning slits 11 of scanning drum 12 are drawn so that their center lines coincide with the side-edges 422 and 423 of aperture 13. This is done to insure that the successive scanning cycles are continuous, without either excessive overlap or blank space, as illustrated at 400 through 403 in Fig. 4 where the cross-hatched portions illustrate the signal due to general background illumination present in the field of view of the telescope 10 while 404, 405, and 406 are the light signals produced by flash 300, when its image in aperture 13 is scanned by slits 11. It may be noticed that in Fig. 4 the background illumination never drops down to zero level; indicated by a reference line 407, which is due to the fact that when the lagging edge of one slot leaves the aperture, the succeeding scanning slot is in full view of the aperture. This being the case, there exists a slight overlap of the two successive slots and, as a consequence, the photo-electric cell is never cut off completely from the aperture. Any excessive overlap of the two adjacent slots with the aperture must be avoided since it would result in confusion and jumbling of information from two parts of the field; blank spaces are not positively objectionable in that they do not result in the confusion of intelligence on the oscilloscope screen but they do limit or decrease the resolution of the total system by decreasing the portion of the frame devoted to useful information. These slots in a typical case pass across the aperture, i. e., scan the field of view, at a rate of not less than 100 times per second. The reason for this rate of scanning will become more apparent on later consideration of the characteristics of the flash, and especially of its duration. Each scansion is in many respects equivalent to one frame of a motion picture film; the terminology of this analogy will be used in several instances in this disclosure. The slotted scanning drum 12, and the magnetic tape are placed on the same vertical shaft 20 which is connected to a motor 21. The tape is mounted concentric with and rigidly attached to either the upper or lower edge of the periphery of the scanning drum, the two being rigidly connected to shaft 20 so that they are rotated at the same speed by motor 21.

In another embodiment of the invention, which is illustrated in Fig. 2, the tape is free-running since it is driven over two pulleys, one of the pulleys, the driver, being connected to shaft 20. This modification will be described in connection with the description in Fig. 2.

An oscillator 22 is connected through a switch 23 to an erasing head 24 which is positioned on the magnetic tape in front of the recording head. Switches 17 and 23 are ganged switches which are opened by the operator immediately after the observation of the flash with the result that the record of the flash is retained on magnetic tape 19 because of a time reservoir provided by the tape. This time reservoir is of the order of 1 second, i. e., if the magnetic tape is mounted upon the scanning cylinder, the cylinder will be driven by the motor at 1 revolution per second. This time reservoir is ample for allowing the operator to disconnect the recording and erasing heads after observing the occurrence of the flash and before the recorded signal is erased by the erasing head.

After the flash has been recorded on magnetic tape 19 and the erasing and reproducing heads disconnected, the recorded signal is viewed on the screen of an oscilloscope 25, the vertical deflection plates of which are connected through mixer 26 and a reproducing amplifier 27 to reproducing heads 28 and 29, which are connected in series but in phase-opposition for eliminating the extraneous background illuminations which may be also present as an additional recorded signal on the magnetic tape. This background signal is illustrated at 400 through 403. The reproducing heads 28 and 29 are spaced with respect to each other, along the magnetic tape so that while the first head 28 is playing back the background signal 400 plus the recorded pulse 404, the other head is playing back the signal due to the background noise 403 alone. The pick-up heads are adjusted to have the same sensitivity so that if the background signal has not changed appreciably during the short time interval required for the tape to travel from the first to the second pick-up head, the background signal is cancelled out and only the signals 404, 405, and 406 due to the gun flash are impressed on the reproducing amplifier 27 and the vertical deflection plates of oscilloscope 25. The two pick-up heads are preferably placed at least 3 frames apart and the scanning cylinder is driven at such a rate that the duration of a typical gun flash shall be scanned in 3 frames, as is disclosed more fully in connection with Fig. 4. The obliterating, recording and pick-up heads are all mounted on a base plate which itself is mounted independently of the scanning disc 12 on a tripod supporting the flash azimuth locator. The reproducing heads 28 and 29 are provided with the mechanical means for shifting their position with respect to the magnetic tape during the preliminary adjustment of the locator which results in shifting of the reproduced signal on the screen of oscilloscope 25 with respect to the marker signals or scale gratings 44 also appearing on the same screen. Once this adjustment has been accomplished, the heads are locked in the desired position, and remain stationary from then on. The sweep circuit 32 of the oscilloscope is synchronized by means of a commutator 31 and a brush 33 with the scanning of the aperture by slots 11 so that a saw-tooth 410, Fig. 4 voltage is generated once during each scanning period in which slot 11 scans aperture 13. Mixer 26 is also connected to a reference marker amplifier 34 which is connected to synchronizing brush 35, and a commutator 36 connected through step-up ratio gears 37 and 38 to shaft 20 and motor 21.

For an understanding of the rate of scanning and synchronization reference is made to Figs. 3 and 4. In Fig. 3 the illustrated curve 300 represents the intensity-of-flash-vs.-time curve of a typical gun flash. The gun flash lasts for approximately 0.03 of a second and may be of the order of 100,000 candlepower. In Fig. 4, 19 represents the magnetic tape with the reproducing heads 28 and 29 placed in the proper position with respect to the tape. The irregular cross-hatched curves 400 through 403 represent the signals recorded on tape 19 due to the light intensity of the background or the previously mentioned background signal, and 404, 405, and 406 represent the superimposed flash signals also recorded on the tape. The first portion 404 of the recorded flash happened to coincide with the maximum candlepower of flash 300 while the remaining portions 405 and 406 reproduce the lower intensities of the flash. It is desirable to have the flash scanned with at least three slots to avoid missing the flash altogether or reproducing only the weaker portions of the illumination. When three slots scan the flash, the scansions being one second apart, one of them is bound to coincide with a fairly high intensity of illumination on the curve, which is apparent from the examination of Figs. 3 and 4. If the duration of the gun flash is in the order of 0.03 second and the drum is driven at such a speed that approximately 3 frames scan the field of view during the duration of the flash, the 4th frame will record only the background noise. Therefore, magnetic head 29, placed 3 frames behind head 28, as illustrated in Fig. 4, will impress the background signal 403 in phase-opposition to the background signal 400 reproduced by head 28, and since the two heads have equal sensitivities, or reasonably so, there will be substantially complete cancellation of the background signal with the result that only the flash signals 404, 405, and 406 will be reproduced as an image 39 on the oscilloscope screen in a manner illustrated in Fig. 1. The linear portion of the saw-tooth voltage 410 has approximately the same period as the time required for scanning with one slot, i. e., 0.01 of a second. If it is desired to scan 3 frames per flash, the scanning cylinder may have 100 evenly spaced slots 11 and be driven at 1 revolution per second. Fig. 4 also illustrates, with the aid of the vertical dotted lines, the synchronization of the magnetic tape, sweep voltage, and the instantaneous position of slots 11 with respect to aperture 13, and arrows 412 and 413 indicate the direction of rotation of drum 12 and tape 19. Examination of Fig. 4 and the relative positions of the elements illustrated in Fig. 4 indicates that the sweep wave 410 must being at the instant when head 28 begins to reproduce signal 400, which during the recording cycle corresponds to the instant when the lagging edge of slit 11 reaches the side-edge 422 or 423 of aperture 13. At this instant the sweep-controlling brush 33 leaves the shorting segment on commutator 31, this shorting segment discharging the saw-tooth generating condenser in the time interval required for slit 11 to travel 0.5 mil across aperture 13, i. e., half of the slits' width. When the synchronization of the reproduction and of the sawtooth generator is as described above, the position of pulse 39 on the oscilloscope screen depends upon the azimuth of the flash since the azimuth of the flash determines the position of its images 404, 405, and 406 within aperture 13, and the remaining apparatus, because of the illustrated timing of the saw-tooth wave 410 with respect to tape 19, and especially the signals recorded on the tape with the aid of the scanning slots 11, simply transfers the images of the flash produced at the aperture onto the oscilloscope screen. Thus the azimuth of the flash determines the position of image 39 on the oscilloscope screen and saw-tooth wave 410 acts as a timing locus for positioning this image in proper azimuth relationship on the screen. The markers 44 are used for determining the actual azimuth reading of the azimuth locator by determining the position of image 39 with respect to the ends of the sweep line 41, Fig. 1, the ends of the sweep line on the screen representing the edges 422 and 423 of aperture 13.

Fig. 2 illustrates a modification of the azimuth locator illustrated in Fig. 1, the modification residing in the elimination of the synchronizing commutators which have been now substituted with an additional photo-electric cell channel, and it is the latter that is used for synchronizing the saw-tooth generator with the recorded signals. Moreover, the recording tape has been made a free-running tape which improves the signal-to-noise ratio in the intelligence channel. It has been stated, in connection with the description of Fig. 1, that magnetic loop 19 moves in synchronism with the scanning cylinder 12, since it is rigidly attached to the periphery of the scanning cylinder. Unless the diameter of the magnetic tape is made uniform within 0.0001 of an inch, the rigidly mounted tape, when rotated at relatively high peripheral speed, produces considerable noise signal which is due to the variation in the degree of coupling, chattering, excessive friction and pressure between the C-type recording and reproducing heads and the magnetic tape mounted within the narrow air-gap of the heads. These disadvantages do not exist when the tape is mounted over two pulleys and the magnetic heads are mounted between the pulleys so that the tape represents a very flexible structure which can very readily adjust itself to any variations in the diameters of the pulleys without exerting undue pressure on the jaws of the magnetic heads or altering the degree of coupling between the tape and the heads. Thus, with the free-running tape, the signal-to-noise ratio and the amplitude of the signals in the reproducing channels are more uniform, but it has the disadvantage that the tape is no longer rigidly connected to the shaft used for rotating the scanning drum. As a consequence, it becomes necessary to provide some additional means for establishing rigid synchronism between the saw-tooth generator and the reproducing channel.

The above modifications are all illustrated in Fig. 2. Some of the elements in Fig. 2 are identical to the elements in Fig. 1 and therefore are designated by the same numerals in both figures. A telescope 10 produces a true image of the intercepted flashes in the plane of aperture 13 which is scanned by a scanning drum 222 equipped with slots 11. Photo-electric cell 15 transforms the incident light into electrical impulses and these are impressed on amplifier 16 and recording head 18. Doublepole, double-throw switches 200 and 202 are connected to the input and output circuits of the amplifier so that it may be used for recording, as well as for reproducing the signals. The intercepted signals are recorded on a freerunning magnetic tape 208 in a manner identical to that of Fig. 1, the tape being driven by a pulley 204 connected to shaft 20 and motor 21; an idler 206 is mounted at the opposite end of the loop. The recording channel is also provided with the serially connected reproducing heads 28 and 29, and an erasing head 24 which is connected to oscillator 22 through switch 23. Thus the recording channel is identical to the one illustrated in Fig. 1, except amplifier 16 is now used for recording as well as for reproducing the signals. The coupling between shaft 20 is now accomplished by means of pulley 204 and rigid synchronism between drum 222 and tape 208 no longer exists because of the unavoidable slippage. Because of this it becomes necessary to record synchronizing signals directly on tape 208, which has been made of sufficient width to record independently two types of signals, the synchronizing signals along one edge of the tape and the intelligence signals along the other. For making the illustration of the synchronizing and of the flash recording channels clearer on the drawing, tape 208 has been illustrated as two independent loops; however, actually the two represent the same tape of sufficient width to permit side-by-side recording of the two types of signals. The synchronizing channel is provided with an erasing head 210 and a recordingreproducing head 212, the erasing head being connected to oscillator 22 while the recording-reproducing head is connected to an amplifier 214 through switches 216 and 218. The lower terminals of switch 216 are connected to a photo-electric cell 220 which is mounted behind scanning drum 222 provided with slits 224, the number of the synchronizing slits 224 being equal to the number of the scanning slits 11. The two portions of the drum are illustrated independently in Fig. 2 for simplifying the drawing; actually the scanning and the synchronizing portions of drum 222 represent a single drum with slits 11 used for scanning aperture 13 and slits 224, which are aligned with slits 11, used for impressing synchronizing signals on amplifier 214. To accomplish this result, the synchronizing channel is provided with a source of light 226, a condenser lens 228, and a small aperture 230 aligned with the optical axis of the condenser. Photoelectric cell 220 intercepts light from source 226 when the scanning slits 224 align themselves with aperture 230. Slits 224 are slightly narrower than slits 11 and are so aligned with respect to slits 11 that a sharp pulse is impressed on amplifier 214 when the leading edge of slit 11 aligns itself with the leading edge of aperture 13. This pulse is impressed by amplifier 214 through switch 218, which during the flash-recording period is in the upper position, on magnetic head 212 which records the synchronizing signals on tape 208. Thus a single synchronizing pulse is recorded for each scansion of aperture 13 and since the scanning drums 222 are in fact a single scanning drum mounted on shaft 20, and tape 208 is in fact a single tape, there is a continuous transfer, by means of the synchronizing pulses, to tape 208 of the positions of the successive scanning slits 11 with respect to aperture 13 so that if there is any slippage between tape 208 and the pulleys it is indicated on the tape by the corresponding displacement of the synchronizing signals 232 on the tape. During the reproducing period the reproducing heads 28 and 29 are connected through amplifier 16 and switches 200 and 202 to a mixer 234 which impresses the recorded flash signals on the vertical plates of oscilloscope 25. The magnetic head 212 is now connected through amplifier 214 and switches 216 and 218 to a marker oscillator 236 and saw-tooth generator 32. In the saw-tooth generator the synchronizing pulses control the timing of the voltage saw-tooth wave 238 which corresponds to saw-tooth wave 410—Fig. 4. The marker oscillator 236 generates sharp pulses 240 which are combined with the flash signals 242 in the mixer with the result that the signals impressed on the vertical deflection plates of the oscilloscope include the flash signals as well as the marker signals. Therefore the visual image produced on the screen of the oscilloscope consists of a series of marker signals 244 and image 39 of the intercepted flash. As in the case of Fig. 1, the azimuth of the intercepted flash is determined by measuring the position of image 39 from the beginning of the sweep. It is to be noted that this point on the screen remains fixed since it always represents the potential across the deflection plates of the oscilloscope at the instant when the saw-tooth generating condenser is at ground potential, i. e., it is fully discharged. In Fig. 2, the marker oscillator may be eliminated altogether and the position of flash signal 39 with respect to the beginning of the sweep may be determined by resorting to a scale provided for this purpose on the screen of the oscilloscope.

Fig. 5 discloses a perspective view of the recording flash azimuth locator. It is mounted on a tripod 500 provided with a base plate 502 which is in threaded engagement with a casting 503 interconnecting the three legs of the tripod. The entire structure of the azimuth locator is supported by a ball-and-socket joint 504, the ball portion of the joint being rigidly connected to the vertical axis of the instrument, which is not visible in the figure, while the socket is an integral part of base plate 502. The entire optical system of the azimuth locator may be leveled by means of leveling screws 510, 511, and 512 and knurled nuts 505, 506, and 507. The leveling screws are connected to an azimuth table, only the outer casing 508 of the table being visible in the figure. The table consists of a stationary, horizontal centrally-mounted disk supported by the vertical axis of the instrument, and a rotating, horizonally-mounted ring concentrically mounted with respect to the disk, the ring being an intgeral part of the outer protective casing 508; the casing and the ring are rotatively mounted on the same vertical axis of the instrument. Casing 508 is provided with a glass-covered window for reading the azimuth settings of the locator, the stationary disk being provided with a reference marker while the azimuth ring is calibrated in degrees and minutes or mils throughout its circumference so that any azimuth setting from 0 to 360 degrees, or from 0 to 6400 mils may be read on the ring when the azimuth table is rotated on the vertical axis. Casing 508 is provided with gears along its inner periphery, and the gears are connected to an azimuth vernier 514 which is an integral part of a worm gear connected to a rotatable crank 515. The vernier is used for precise adjustment of the azimuth settings of the locator. Means are also provided, illustrated at 516, for disengaging the vernier gear whenever it is desired to turn quickly the entire instrument by hand through a large angle. The azimuth table 508 is also provided with two levels at right angles with respect to each other (not visible in the figure) which enable the operator, by using the leveling screws, to level the azimuth table, which in turn puts the axis of the azimuth locator into the vertical position. The azimuth locator per se is supported by a member 517 which acts as a hub mounted on the vertical axis of the instrument; the hub is provided with a horizontal flange 518, matching a similar flange on the top of casing 508, the upper flange rotating around the lower flange. The flanges provide large horizontal bearing surfaces for supporting the locator in proper alignment with the vertical axis. The angular position of the entire optical system of the azimuth locator may be adjusted with respect to the azimuth scale by rotating hub 517. A locking arm 528 is provided for locking and unlocking the hub 517 with respect to the vertical axis. Accordingly, when the upper structure of the azimuth locator is turned on hub 517 around the vertical axis, and the latter is in the vertical position, the optical axes of the sighting-telescope and of the scanning system will be rotated in the two parallel horizontal planes. Rotatable hub 517 terminates in a U-shaped member 519 supporting a horizontal axis 520 of the locator, the horizontal axis being connected to the upper frame members 521 and 522 supporting the sighting-telescope 523 and a drum 524 housing the scanning and the recording elements of the locator. A rotatable sector 525, having the shape of an arc with the radii of the arc connected to hub 517, is provided with gear-teeth, disposed along the outer periphery of the arc. These gear-teeth engage a worm-gear (not visible in the figure) connected to a knob 526. Turning of knob 526 rotates sector 525 and axis 520, which increases or decreases the angle of elevation of the optical axes of the sighting-telescope 523 and of the scanning system lens 527 mounted in front of the scanning system of the azimuth locator. Lens 527 is supported by the sidewall of drum 524. Drum 524 is supported by brackets 532 and 534 which are connected to the upper frame members 521 and 522. Drum 524 houses telescope 527, the scanning system, and the recording, synchronizing and reproducing channels, with the exception of the oscilloscope, the latter being located in the pill box. Sector 525 and knob 526 are provided with the angular scales 536 and 538 which indicate, when the axis of the instrument is in the vertical position, the elevation angle of the optical axes of the locator with respect to the horizontal plane. All power, synchronizing and intelligence signal connections between the locator and the central station are accomplished over shielded conductors 540 and 542. The locator is also provided with a reticle light 530 and a light 546 for the elevation and azimuth scales, these lights being connected to a source of electrical energy through a cable 548. The sighting-telescope 523 is provided with an additional level 550 which is used for a more precise leveling of the optical axis of the telescope. The azimuth locator is also provided with a "box" compass mounted in a box 552 which makes it possible to determine the position of the north-south line at the location of the instrument whenever such determination is desirable. Because of the use of a compass in connection with the locator, the structural elements of the locator are made of non-magnetic materials. A local starting switch 544 and a sensitivity control knob 545 are mounted on the back plate of housing 524.

Calibration and alignment of the flash azimuth locator is as follows: Sighting-telescope 523 is pointed at a fixed light source located at a known distance with the light centered on the reticle of the telescope. The center of the field of view of lens 527 and of the scanning system is then determined by rotating the instrument around its vertical axis by means of crank 515 and noting the azimuth at which the light source pattern on the oscilloscope disappears. The same is repeated for determining the angular position of the other edge of the aperture. The difference between the azimuth readings is divided by two and the azimuth table is then set so that the light source is in the center of the field of view of lens 527. The cross-hairs, or the reticle of a sighting-telescope 523 is now adjusted so that the image of the light source in the eye-piece 546 appears directly at the intersection of the cross-hairs, whereupon their position is locked. The optical axes of telescope 523 and lens 527 are now parallel to each other.

To calibrate the azimuth scale of the oscilloscope, a fixed distant light source is observed through the scanning system so that the light to the azimuth instrument is laid successively on each edge of the field and on several positions within the field, and the azimuth scale readings are noted for each setting. The position of the images on the base line, or their positions with respect to the reference markers on the screen, are also noted and the screen readings are then transformed into the angle readings by using the readings noted on the azimuth scale.

It is to be noted that accurate azimuth readings are obtainable with the disclosed azimuth locator only when the side-edges of the aperture are in the vertical position. To adjust the side edges of the aperture into the vertical position it is only necessary to adjust the leveling screws 510, 511 and 512, the remaining elements of the azimuth locator being aligned at the factory.

The invention has been disclosed with the disconnecting switches 17 and 23 operated manually. Switching of the equipment from recording position to a reproducing position may be also accomplished automatically. The automatic operation of the switches may be performed as follows: An independent auxiliary scanning system, such as the one used for intercepting flashes, and including a lens, an aperture, a scanning drum (which may be the extension of the main scanning drum, as illustrated in Fig. 2), a photo-electric cell and a photo-electric cell amplifier, is connected to a relay. This auxiliary flash-intercepting channel actuates the relay when a flash occurs, the normal position of the relay corresponding to the recording position of the system. When the relay is actuated, its position is changed over to the reproducing position and the recording and erasing heads are de-energized. The relay is a slow-acting relay, which gives sufficient time lag for disconnecting the recording channel and the erasing head, and for connecting the reproducing channel after the entire flash has been recorded on the magnetic tape. Automatic switching of the recording and reproducing channels in the described manner is especially desirable when the operator occupies such position with respect to the region under observation which does not allow him to observe very readily the occurrence of the flashes. When this is the case, the use of the automatic switching system becomes a matter of necessity. After the locking relay has been actuated and it locks itself in a reproducing position, it is unlocked, and the system restored again to the recording position, by means of a push-button located at the position of the operator so that the recording cycle may be resumed again without the necessity of the operator leaving the central operating station.

It is believed that the construction of the flash azimuth locators disclosed in this specification, as well as the advantages thereof, will be apparent from the foregoing description. It should be understood therefore that while the invention is being illustrated and described in several preferred forms, reasonable changes and modifications may be made by those skilled in the art without departing from the spirit of the invention as sought to be defined in the following claims.

We claim:

1. A flash azimuth locator including a lens, an aperture at the image plane of said lens, said lens forming an instantaneous real image of said flash at said aperture in the azimuth relationship with respect to the center of said aperture corresponding to the azimuth relationship of said flash with respect to the optical axis of said lens, and instrumentalities, including scanning means in scanning relationship with respect to said aperture for sequentially scanning azimuthal elemental areas of said aperture, recording means synchronized with said scanning means for recording said flash and reproducing means connected to said recording means, for converting said instantaneous image into a recurrent image of said flash along a base-line, the position of said recurrent image along said base-line corresponding to the azimuth position of said real image at said aperture.

2. A flash azimuth locator including a lens, an aperture at the true image plane of said lens said lens forming an instantaneous real image of said flash in the plane of said aperture, the position of said image within said aperture corresponding to the azimuth of said flash with respect to the optical axis of said lens, instrumentalities, including scanning means in scanning relationship with respect to said aperture for sequentially scanning azimuthal elemental areas of said aperture, recording means synchronized with said scanning means for recording said flash, and additional instrumentalities for reproducing the record of said flash as a recurrent image of said flash along a base-line, the position of said recurrent image along said base-line corresponding to the position of said real image within said aperture.

3. A flash azimuth locator including a lens pointing with its angle of acceptance in the direction of the anticipated flash, a rectangular aperture at the image plane of said lens, said lens forming an instantaneous real image of said flash within said aperture, the position of said image with respect to a vertical line through the center of said aperture corresponding to the azimuth of said flash with respect to the optical axis of said lens, a recording channel including scanning means for scanning azimuthal elemental areas of said aperture, recording means synchronized with said scanning means for making a record of said flash, and a reproducing channel connected to said recording means for generating a recurrent image of said record at right angle to a calibrated base-line, the position of said recurrent image along said base-line indicating the azimuth of said flash.

4. A flash azimuth locator including a lens, an aperture at the image plane of said lens, said lens forming an instantaneous image of said flash in the plane of said aperture, the position of said image within said aperture corresponding to the azimuth of said flash with respect to the optical axis of said lens, a system for scanning azimuthal elemental areas of said aperture, recording means synchronized with said scanning system for making a record of said instantaneous image of said flash, reproducing means in reproducing relationship with respect to said recording means, indicating means, means for establishing an azimuth locus synchronized with said scanning means on said indicating means, and means for connecting said reproducing means to said indicating means to present a recurrent indication of the azimuthal location of said flash.

5. A flash azimuth locator including a lens, a rectangular aperture at the image plane of said lens, said lens forming an instantaneous image of said flash in the plane of said aperture, the position of said image within said aperture corresponding to the azimuth of said flash with respect to the optical axis of said lens, a scanning drum having a plurality of scanning slits in scanning relationship with respect to said aperture, said slits scanning said aperture from one vertical side-edge of the aperture to the other, a photo-electric cell in a light-intercepting relationship with respect to said aperture and situated on the other side of said scanning drum from said aperture, said photo-electric cell converting the scanned images within said aperture into electrical pulses, an amplifier, a magnetic recording head connected to said amplifier, and a magnetic tape in recording relationship with respect to said head, said head recording said pulses on said tape.

6. A flash azimuth locator as defined in claim 5 which further includes a commutator driven by said scanning means, and a reproducing channel connected to said commutator and coupled to said tape for reproducing the recorded pulses as recurrent visual images along a timing locus, the position of said persistent images along said locus corresponding to the azimuth of said flash with respect to said lens.

7. A flash azimuth locator including a lens, a rectangular aperture in the image plane of said lens, instrumentalities for continuously scanning said aperture from one side-edge of said aperture to the other, a flash-recording channel connected to said instrumentalities, means connected between said recording channel and said instrumentalities for synchronizing said recording channel with the scanning of said aperture, said recording channel being responsive to the intensity of radiant energy in the area of said image being scanned at any instant to record said flash, and a reproducing channel including cathode ray indicating means connected to said recording channel for repeatedly reproducing the recorded flash as a visual, recurrent image along a time base, the position of said image along said base corresponding to the position of the image of said flash between the side-edges of said aperture.

8. A flash azimuth locator as defined in claim 7 in which said instrumentalities comprise a rotating drum, a plurality of equidistant slots, the side-edges of said slots and the axis of said drum being all parallel to the side-edges of said aperture, the distance between the center locus of said slots being equal to the distance between said side-edges, and the optical axis of said lens being radial to said drum and passing through the center of said aperture.

9. A flash azimuth locator as defined in claim 7 in which said flash recording channel includes a photo-electric cell intercepting the results of said scanning, an amplifier, a magnetic recording head, a magnetic tape in a form of a continuous loop, said loop being driven in synchronism with said scanning instrumentalities, an erasing head mounted in front of said recording head, an oscillator connected to said erasing head, and means for connecting and disconnecting said recording and erasing heads from said amplifier.

10. A flash azimuth locator as defined in claim 7 in which said reproducing channel includes a magnetic tape record driven by the same means used for driving said scanning instrumentalities, a reproducing head, an amplifier connected to said reproducing head, a cathode-ray oscilloscope, a sweep circuit for said oscilloscope, and means for synchronizing the linear portions of the sawtooth wave generated by said sweep circuit with the scanning periods of said scanning instrumentalities, whereby substantially the entire distance between the side-edges of said aperture is reproduced on the screen of said oscilloscope as a visible line, and the record of said flash is reproduced as said recurrent image on said screen along said line, the position of said recurrent image on said line corresponding to the position of the image of said flash within said aperture.

11. A flash azimuth locator including an optical system having a given angle of acceptance and having its axis pointing in the direction of the anticipated flash to form a real image of the area subtended by said angle of acceptance, means for periodically scanning said image in azimuth, recording means synchronized with the scanning of said image and responsive to the intensity of radiant energy in the area of said image being scanned at any instant, a reproducing channel connected to said recording means for reproducing the results of said recording including means for displaying said flash along a base line proportional to the azimuth of said image, and means synchronized by said scanning means for deriving azimuth markers along said base line.

12. A flash azimuth locator as defined in claim 11, in which said azimuth marker means comprises a commutator producing a given plurality of marker pulses for each scanning of said image and electrical connections for applying said marker pulses to said display means.

13. A flash azimuth locator as defined in claim 11, further including means for measuring the azimuth of the axis of said optical system with respect to a reference direction.

14. A flash azimuth locator as defined in claim 11 in which said means includes a source of light, a photo-electric cell, an amplifier connected to said photo-electric cell, and instrumentalities for scanning said light in synchronism with said image scanning means.

15. A flash azimuth locator as defined in claim 11 in which said azimuth marker means includes a source of light, a photo-electric cell, an amplifier connected to said cell, a magnetic recording head in recording relationship with respect to a magnetic tape, said tape being a common tape for said recording means and for said azimuth marker means, and instrumentalities for scanning said light in a predetermined time relationship with the scanning of said image whereby the results of scanning of said light and of said image are recorded on said tape.

References Cited in the file of this patent

UNITED STATES PATENTS

| | | |
|---|---|---|
| 875,437 | Kauffmann | Dec. 31, 1907 |
| 1,921,630 | Mechau | Aug. 8, 1933 |
| 2,015,869 | Pulz | Oct. 1, 1935 |
| 2,216,716 | Withem | Oct. 1, 1940 |
| 2,320,908 | Busignies | June 1, 1943 |
| 2,378,383 | Arndt | June 19, 1945 |
| 2,379,496 | Saunier | July 3, 1945 |
| 2,412,670 | Epstein | Dec. 17, 1946 |
| 2,414,566 | Thomas | Jan. 21, 1947 |
| 2,418,136 | Munson et al. | Apr. 1, 1947 |
| 2,425,003 | Potter | Aug. 5, 1947 |
| 2,432,026 | Loughlin | Dec. 2, 1947 |

FOREIGN PATENTS

| | | |
|---|---|---|
| 15,493 | Great Britain | of 1900 |